(12) United States Patent
Takita et al.

(10) Patent No.: US 8,021,789 B2
(45) Date of Patent: Sep. 20, 2011

(54) MICROPOROUS MEMBRANE AND MANUFACTURING METHOD

(75) Inventors: Kotaro Takita, Nasusiobara (JP); Shintaro Kikuchi, Saitama (JP)

(73) Assignee: Toray Tonen Specialty Separator Godo Kaisha (JP)

( * ) Notice: Subject to any disclaimer, the term of this patent is extended or adjusted under 35 U.S.C. 154(b) by 491 days.

(21) Appl. No.: 11/864,214

(22) Filed: Sep. 28, 2007

(65) Prior Publication Data

US 2009/0087750 A1 Apr. 2, 2009

(51) Int. Cl.
*H01M 2/16* (2006.01)

(52) U.S. Cl. ........................................... 429/254

(58) Field of Classification Search .................. 429/254; 264/41, 247
See application file for complete search history.

(56) References Cited

U.S. PATENT DOCUMENTS

| | | | |
|---|---|---|---|
| 5,922,492 A | 7/1999 | Takita et al. | |
| 2005/0098913 A1* | 5/2005 | Funaoka et al. | 264/41 |
| 2007/0264483 A1 | 11/2007 | Ozaki et al. | |
| 2008/0020192 A1 | 1/2008 | Yen et al. | |

FOREIGN PATENT DOCUMENTS

| | | |
|---|---|---|
| JP | 6-240036 | 8/1994 |
| WO | WO 99/48959 | 9/1999 |
| WO | WO 00/20492 | 4/2000 |
| WO | WO 02/072248 | 9/2002 |
| WO | WO 2005/113657 | 12/2005 |

* cited by examiner

*Primary Examiner* — Christina Johnson
*Assistant Examiner* — Larry Thrower
(74) *Attorney, Agent, or Firm* — DLA Piper LLP (US)

(57) ABSTRACT

A microporous membrane having a structure in which its pore size distribution curve obtained by mercury intrusion porosimetry has at least two peaks, which is produced by extruding a combination of a diluent or solvent and a polyolefin resin composition comprising (a) from about 74 to about 99% of a first polyethylene resin having a weight average molecular weight of from about $2.5 \times 10^5$ to about $5 \times 10^5$ and a molecular weight distribution of from about 5 to about 100, (b) from about 1 to about 5% of a second polyethylene resin having a weight average molecular weight of from about $5 \times 10^5$ to about $1 \times 10^6$ and a molecular weight distribution of from about 5 to about 100, and (c) from 0 to about 25% of a polypropylene resin having a weight average molecular weight of from about $3 \times 10^5$ to about $1.5 \times 10^6$, a molecular weight distribution of from about 1 to about 100, and a heat of fusion of 80 J/g or higher, percentages based on the mass of the polyolefin composition; cooling the extrudate to form a high polyolefin content cooled extrudate; stretching the cooled extrudate in at least one direction at a high stretching temperature to form a stretched sheet; removing at least a portion of the diluent or solvent from the stretched sheet to form a membrane; stretching the membrane to a high magnification in at least one direction to form a stretched membrane; and heat-setting the stretched membrane to form the microporous membrane.

14 Claims, No Drawings

MICROPOROUS MEMBRANE AND MANUFACTURING METHOD

FIELD OF THE INVENTION

The present invention relates to a microporous membrane having suitable permeability, mechanical strength, heat shrinkage resistance, and excellent electrolytic solution absorption and compression resistance properties, and a method for producing such a microporous membrane. It also relates to battery separators comprising such a microporous membrane, and to batteries utilizing such battery separators.

BACKGROUND OF THE INVENTION

Microporous membranes are useful as separators for primary batteries and secondary batteries such as lithium ion secondary batteries, lithium-polymer secondary batteries, nickel-hydrogen secondary batteries, nickel-cadmium secondary batteries, nickel-zinc secondary batteries, silver-zinc secondary batteries, etc. When the microporous membrane is used as a battery separator, particularly for lithium ion batteries, the membrane's performance significantly affects the battery's properties, productivity, and safety. Accordingly, the microporous membrane should have appropriate permeability, mechanical properties, heat resistance, dimensional stability, shutdown properties, meltdown properties, etc. It is desirable for such batteries to have a relatively low shutdown temperature and a relatively high meltdown temperature for improved battery safety properties, particularly for batteries exposed to high temperatures under operating conditions. High separator permeability is desirable for high capacity batteries. A separator with high mechanical strength is desirable for improved battery assembly and fabrication.

The optimization of material compositions, stretching conditions, heat treatment conditions, etc., has been proposed to improve the properties of microporous membranes used as battery separators. For example, JP6-240036A discloses a microporous polyolefin membrane having improved pore diameter and a sharp pore diameter distribution. The membrane is made from a polyethylene resin containing 1% or more by mass of ultra-high molecular weight polyethylene having a weight average molecular weight ("Mw") of $7 \times 10^5$ or more, the polyethylene resin having a molecular weight distribution (weight average molecular weight/number-average molecular weight) of 10 to 300, and the microporous polyolefin membrane having a porosity of 35 to 95%, an average penetrating pore diameter of 0.05 to 0.2 µm, a rupture strength (15 mm width) of 0.2 kg or more, and a pore diameter distribution (maximum pore diameter/average penetrating pore diameter) of 1.5 or less. This microporous membrane is produced by extruding a melt-blend of the above polyethylene resin and a membrane-forming solvent through a die, stretching the gel-like sheet obtained by cooling at a temperature from the crystal dispersion temperature ("Tcd") of the above polyethylene resin to the melting point +10° C., removing the membrane-forming solvent from the gel-like sheet, re-stretching the resultant membrane to 1.5 to 3 fold as an area magnification at a temperature of the melting point of the above polyethylene resin −10° C. or less, and heat-setting it at a temperature from the crystal dispersion temperature of the above polyethylene resin to the melting point.

WO 1999/48959 discloses a microporous polyolefin membrane having suitable strength and permeability, as well as a uniformly porous surface without local permeability variations. The membrane is made of a polyolefin resin, for instance, high density polyethylene, having an Mw of 50,000 or more and less than 5,000,000, and a molecular weight distribution of 1 or more to less than 30, which has a network structure with fine gaps formed by uniformly dispersed micro-fibrils, having an average micro-fibril size of 20 to 100 nm and an average micro-fibril distance of 40 to 400 nm. This microporous membrane is produced by extruding a melt-blend of the above polyolefin resin and a membrane-forming solvent through a die, stretching a gel-like sheet obtained by cooling at a temperature of the melting point of the above polyolefin resin −50° C. or higher and lower than the melting point, removing the membrane-forming solvent from the gel-like sheet, re-stretching it to 1.1 to 5 fold at a temperature of the melting point of the above polyolefin resin −50° C. or higher and lower than the melting point, and heat-setting it at a temperature from the crystal dispersion temperature of the above polyolefin resin to the melting point.

WO 2000/20492 discloses a microporous polyolefin membrane of improved permeability which is characterized by fine polyethylene fibrils having an Mw of $5 \times 10^5$ or more, the composition comprising polyethylene. The microporous polyolefin membrane has an average pore diameter of 0.05 to 5 µm, and the percentage of lamellas at angles θ of 80 to 100° relative to the membrane surface is 40% or more in longitudinal and transverse cross sections. This polyethylene composition comprises 1 to 69% by weight of ultra-high molecular weight polyethylene having a weight average molecular weight of $7 \times 10^5$ or more, 98 to 1% by weight of high density polyethylene and 1 to 30% by weight of low density polyethylene. This microporous membrane is produced by extruding a melt-blend of the above polyethylene composition and a membrane-forming solvent through a die, stretching a gel-like sheet obtained by cooling, heat-setting it at a temperature from the crystal dispersion temperature of the above polyethylene or its composition to the melting point +30° C., and removing the membrane-forming solvent.

WO 2002/072248 discloses a microporous membrane having improved permeability, particle-blocking properties and strength. The membrane is made using a polyethylene resin having an Mw of less than 380,000. The membrane has a porosity of 50 to 95% and an average pore diameter of 0.01 to 1 µm. This microporous membrane has a three-dimensional network skeleton formed by micro-fibrils having an average diameter of 0.2 to 1 µm connected to each other throughout the overall microporous membrane, and openings defined by the skeleton to have an average diameter of 0.1 µm or more and less than 3 µm. This microporous membrane is produced by extruding a melt-blend of the above polyethylene resin and a membrane-forming solvent through a die, removing the membrane-forming solvent from the gel-like sheet obtained by cooling, stretching it to 2 to 4 fold at a temperature of 20 to 140° C., and heat-treating the stretched membrane at a temperature of 80 to 140° C.

WO 2005/113657 discloses a microporous polyolefin membrane having suitable shutdown properties, meltdown properties, dimensional stability, and high-temperature strength. The membrane is made using a polyolefin composition comprising (a) polyethylene resin containing 8 to 60% by mass of a component having a molecular weight of 10,000 or less, and an Mw/Mn ratio of 11 to 100, wherein Mn is the number-average molecular weight of the polyethylene resin, and a viscosity-average molecular weight ("Mv") of 100,000 to 1,000,000, and (b) polypropylene. The membrane has a porosity of 20 to 95%, and a heat shrinkage ratio of 10% or less at 100° C. This microporous polyolefin membrane is produced by extruding a melt-blend of the above polyolefin and a membrane-forming solvent through a die, stretching the gel-like sheet obtained by cooling, removing the membrane-forming solvent, and annealing the sheet.

With respect to the properties of separators, not only permeability, mechanical strength, dimensional stability, shutdown properties and meltdown properties, but also properties related to battery productivity such as electrolytic solution absorption, and battery cyclability, such as electrolytic solution retention properties, have recently been given importance. In particular, electrodes for lithium ion batteries expand and shrink according to the intrusion and departure of lithium, and an increase in battery capacity leads to larger expansion ratios. Because separators are compressed when the electrodes expand, it is desired that the separators when compressed suffer as little a decrease as possible in electrolytic solution retention.

Moreover, even though improved microporous membranes are disclosed in JP6-240036A, WO 1999/48959, WO 2000/20492, WO 2002/072248, and WO 2005/113657, further improvements are still needed, particularly in membrane permeability, mechanical strength, heat shrinkage resistance, compression resistance, and electrolytic solution absorption properties. It is thus desired to form battery separators from microporous membranes having improved permeability, mechanical strength, heat shrinkage resistance, compression resistance and electrolytic solution absorption.

SUMMARY OF THE INVENTION

The present invention relates to the discovery of a microporous membrane having good permeability, mechanical strength, heat shrinkage resistance, and improved electrolytic solution absorption and compression resistance properties. An embodiment of the invention relates to a microporous membrane comprising pores characterized by a pore size (or pore diameter when the pores are approximately spherical) distribution curve obtained by mercury intrusion porosimetry having at least two peaks. It has been discovered that such a membrane has good permeability, mechanical strength, heat shrinkage resistance, and improved compression resistance and electrolytic solution absorption characteristics. The microporous membrane of the present invention can be manufactured by steps comprising (1) combining a polyolefin composition and at least one diluent, for example a membrane-forming solvent, to form a polyolefin solution, the polyolefin composition comprising (a) from about 74 to about 99% of a first polyethylene resin having a weight average molecular weight of from about $2.5 \times 10^5$ to about $5 \times 10^5$ and a molecular weight distribution of from about 5 to about 100, (b) from about 1 to about 5% of a second polyethylene resin having a weight average molecular weight of from about $5 \times 10^5$ to about $1 \times 10^6$ and a molecular weight distribution of from about 5 to about 100, and (c) from about 0 to about 25% of a polypropylene resin having a weight average molecular weight of from about $3 \times 10^5$ to about $1.5 \times 10^6$, a molecular weight distribution of from about 1 to about 100, and a heat of fusion of 80 J/g or higher, percentages based on the mass of the polyolefin composition, (2) extruding the polyolefin solution through a die to form an extrudate, (3) cooling the extrudate to form a cooled extrudate having a high polyolefin content, (4) stretching the cooled extrudate to a magnification of from, e.g., about 9 to about 400 fold in at least one direction at a high stretching temperature of from about Tcd of the combined polyethylene of the cooled extrudate to about Tcd +30° C. to form a stretched sheet, (5) removing at least a portion of the diluent, e.g. a membrane-forming solvent, from the stretched sheet to form a membrane, (6) stretching the membrane to a high magnification of from about 1.1 to about 1.8 fold in at least one direction to form a stretched membrane, and (7) heat-setting the stretched membrane to form the microporous membrane.

In an embodiment, the microporous membrane has dense domains corresponding to a main peak in a range of 0.01 to 0.08 μm in the pore size (or pore diameter when the pores are approximately spherical) distribution curve, and coarse domains corresponding to at least one sub-peak in a range of more than 0.08 μm to 1.5 μm in the pore size (or pore diameter when the pores are approximately spherical) distribution curve. In an embodiment, the pore volume ratio of the dense domains to the coarse domains is 0.5 to 49. In an embodiment, the microporous membrane has surface roughness of $3 \times 10^2$ nm or more as the maximum height difference between any two points on the surface of the membrane. In an embodiment, the upper limit on the surface roughness of the microporous membrane is $3 \times 10^3$ nm. With surface roughness within this range, the microporous membrane has a large contact area with an electrolytic solution when used as a battery separator, exhibiting suitable electrolytic solution absorption characteristics.

The resins used in forming the polyolefin solution comprise (a) a first polyethylene resin having a weight average molecular weight of from about $2.5 \times 10^5$ to about $5 \times 10^5$, for example from about $2.5 \times 10^5$ to about $4 \times 10^5$, and a molecular weight distribution of from about 5 to about 100, for example from about 7 to about 50, (b) a second polyethylene resin having a weight average molecular weight of from about $5 \times 10^5$ to about $1 \times 10^6$ and a molecular weight distribution of from about 5 to about 100, for example from about 5 to about 50, and (c) optionally a polypropylene resin having a weight average molecular weight of from about $3 \times 10^5$ to about $1.5 \times 10^6$, for example from about $6 \times 10^5$ to about $1.5 \times 10^6$, and a molecular weight distribution of from about 1 to about 100, for example from about 1.1 to about 50, and a heat of fusion of 80 J/g or higher, for example from 80 to about 200 J/g, percentages based on the mass of the polyolefin composition. The microporous membrane may suitably comprise 25% or less by mass of polypropylene obtained from polypropylene resin and 75% by mass or more of polyethylene obtained from polyethylene resins, based on the mass of the microporous polyolefin membrane.

In an embodiment, the microporous membrane is manufactured by a method comprising the steps of (1) combining a polyolefin composition and at least one membrane-forming solvent to form a polyolefin solution, the polyolefin composition comprising (a) from about 74 to about 99% of a first polyethylene resin having a weight average molecular weight of from about $2.5 \times 10^5$ to about $5 \times 10^5$ and a molecular weight distribution of from about 5 to about 100, (b) from about 1 to about 5% of a second polyethylene resin having a weight average molecular weight of from about $5 \times 10^5$ to about $1 \times 10^6$ and a molecular weight distribution of from about 5 to about 100, and (c) from about 0 to about 25% of a polypropylene resin having a weight average molecular weight of from about $3 \times 10^5$ to about $1.5 \times 10^6$, a molecular weight distribution of from about 1 to about 100, and a heat of fusion of 80 J/g or higher, percentages based on the mass of the polyolefin composition, with the solution preferably having a solvent concentration of from about 25 to about 50% by mass, for example from about 30 to about 50% by mass, based on the mass of the polyolefin solution, (2) extruding the polyolefin solution through a die to form an extrudate, (3) cooling the extrudate to form a cooled extrudate having a high polyolefin content, (4) stretching the cooled extrudate to a magnification of, e.g., from about 9 to about 400 fold in at least one direction at a high stretching temperature of from about Tcd of the combined polyethylene of the cooled extrudate to about Tcd +30° C. to form a stretched sheet, (5) removing at least a portion of the membrane-forming solvent from the stretched sheet to form a membrane, (6) stretching the membrane to a high magnification of from about 1.1 to about 1.8 fold, for example from about 1.2 to about 1.6 fold, in at least one direction to form a stretched membrane, and (7) heat-setting the stretched membrane to form the microporous membrane.

In the above method, the stretching of the microporous membrane in step (6) may be called "re-stretching", because it is conducted after the stretching of the cooled extrudate in step (4).

DETAILED DESCRIPTION OF THE INVENTION

[1] Production of the Melt
(1) Polyolefin Composition

The present inventions relates to a method for making a microporous film having enhanced properties, especially electrolyte injection and compression properties. As an initial step, certain specific polyethylene resins and, optionally, a certain specific polypropylene resin can be combined, e.g. by melt-blending, to form a polyolefin composition.

The polyolefin composition comprises (a) from about 74 to about 99%, for example from about 75 to about 98%, of a first polyethylene resin having a weight average molecular weight of from about $2.5 \times 10^5$ to about $5 \times 10^5$ and a molecular weight distribution of from about 5 to about 100, (b) from about 1 to about 5%, for example from about 2 to about 5%, of a second polyethylene resin having a weight average molecular weight of from about $5 \times 10^5$ to about $1 \times 10^6$, and (c) from 0 to about 25% polypropylene resin having a weight average molecular weight of from about $3 \times 10^5$ to about $1.5 \times 10^6$, a molecular weight distribution of from about 1 to about 100, and a heat of fusion of 80 J/g or higher, percentages based on the mass of the polyolefin composition.

(a) Polyethylene Resins
(i) Composition

The first polyethylene resin, for example a high density polyethylene (HDPE) resin, has a weight average molecular weight of from about $2.5 \times 10^5$ to about $5 \times 10^5$ and a molecular weight distribution of from about 5 to about 100. A non-limiting example of the first polyethylene resin for use herein is one that has a weight average molecular weight of from about $2.5 \times 10^5$ to about $4 \times 10^5$ and a molecular weight distribution of form about 7 to about 50. The first polyethylene resin can be an ethylene homopolymer, or an ethylene/α-olefin copolymer, such as, for example, one containing a small amount, e.g. about 5 mole %, of a third α-olefin. The third α-olefin, which is not ethylene, is preferably propylene, butene-1, pentene-1, hexene-1, 4-methylpentene-1, octene-1, vinyl acetate, methyl methacrylate, or styrene or combinations thereof. Such copolymer is preferably produced using a single-site catalyst.

The second polyethylene resin, for example an ultra-high molecular weight polyethylene (UHMWPE) resin, has a weight average molecular weight of from about $5 \times 10^5$ to about $1 \times 10^6$ and a molecular weight distribution of from about 5 to about 100. A non-limiting example of the second polyethylene resin for use herein is one that has a molecular weight distribution of form about 5 to about 50. The second polyethylene resin can be an ethylene homopolymer, or an ethylene/α-olefin copolymer, such as, for example, one containing a small amount, e.g. about 5 mole %, of a third α-olefin. The third α-olefin, which is not ethylene, can be, for example, propylene, butene-1, pentene-1, hexene-1, 4-methylpentene-1, octene-1, vinyl acetate, methyl methacrylate, or styrene or combinations thereof. Such copolymer is preferably produced using a single-site catalyst.

(ii) Molecular Weight Distribution Mw/Mn

Mw/Mn is a measure of molecular weight distribution. The larger this value, the wider the molecular weight distribution. The Mw/Mn of the overall polyethylene composition for use herein is preferably from about 5 to about 100, for example from about 7 to about 50. When the Mw/Mn is less than 5, the percentage of a higher molecular weight component is too high to conduct melt extrusion easily. On the other hand, when the Mw/Mn is more than 100, the percentage of a lower molecular weight component is too high, resulting in decrease in the strength of the resulting microporous membrane. The Mw/Mn of polyethylene (homopolymer or an ethylene/α-olefin copolymer) can be properly controlled by a multi-stage polymerization. The multi-stage polymerization method is preferably a two-stage polymerization method comprising forming a high molecular weight polymer component in the first stage, and forming a low molecular weight polymer component in the second stage. In the polyethylene composition for use herein, the larger the Mw/Mn, the larger difference in Mw exists between higher molecular weight polyethylene and lower molecular weight polyethylene, and vice versa. The Mw/Mn of the polyethylene composition can be properly controlled by the molecular weights and mixing ratios of components.

(b) Polypropylene resin

The polypropylene resin for optional use herein has a weight average molecular weight of from about $3 \times 10^5$ to about $1.5 \times 10^6$, for example from about $6 \times 10^5$ to about $1.5 \times 10^6$, a heat of fusion of 80 J/g or higher, for non-limiting example from about 80 to about 200 J/g, and a molecular weight distribution of from about 1 to about 100, for example from about 1.1 to about 50, and can be a propylene homopolymer or a copolymer of propylene and another, i.e. a fourth, olefin, though the homopolymer is preferable. The copolymer may be a random or block copolymer. The fourth olefin, which is an olefin other than propylene, includes α-olefins such as ethylene, butene-1, pentene-1, hexene-1, 4-methylpentene-1, octene-1, vinyl acetate, methyl methacrylate, styrene, etc., and diolefins such as butadiene, 1,5-hexadiene, 1,7-octadiene, 1,9-decadiene, etc. The percentage of the fourth olefin in the propylene copolymer is preferably in a range that does not deteriorate the properties of the microporous membrane such as heat resistance, compression resistance, heat shrinkage resistance, etc., and is preferably less than about 10 mole %, e.g. from about 0 to less than about 10 mole %.

The amount of polypropylene resin in the polyolefin composition is 25% or less by mass based on 100% of the mass of the polyolefin composition. When the percentage of polypropylene is more than 25% by mass, the resultant microporous membrane has relatively lower strength and is difficult to form into a bimodal structure. The percentage of polypropylene resin may be, for example, from about 5 to about 20% by mass, and for further example from about 7 to about 15% by mass of the polyolefin composition.

(2) Other Components

In addition to the above components, the polyolefin solution can contain (a) additional polyolefin and/or (b) heat-resistant polymer resins having melting points or glass transition temperatures (Tg) of about 170° C. or higher, in amounts not deteriorating the properties of the microporous membrane, for example 10% or less by mass based on the polyolefin composition.

(a) Additional Polyolefins

The additional polyolefin can be at least one of (a) polybutene-1, polypentene-1, poly-4-methylpentene-1, polyhexene-1, polyoctene-1, polyvinyl acetate, polymethyl methacrylate, polystyrene and an ethylene/α-olefin copolymer, each of which may have an Mw of form $1\times10^4$ to $4\times10^6$, and (b) a polyethylene wax having an Mw of form $1\times10^3$ to $1\times10^4$. Polybutene-1, polypentene-1, poly-4-methylpentene-1, polyhexene-1, polyoctene-1, polyvinyl acetate, polymethyl methacrylate and polystyrene are not restricted to homopolymers, but may be copolymers containing still other α-olefins.

(b) Heat-resistant Resins

The heat-resistant resins can be, for example, (a) amorphous resins having melting points of about 170° C. or higher, which may be partially crystalline, and (b) completely amorphous resins having Tg of about 170° C. or higher and mixtures thereof. The melting point and Tg are determined by differential scanning calorimetry (DSC) according to method JIS K7121. Specific examples of the heat-resistant resins include polyesters such as polybutylene terephthalate (melting point: about 160-230° C.), polyethylene terephthalate (melting point: about 250-270° C.), etc., fluororesins, polyamides (melting point: 215-265° C.), polyarylene sulfide, polyimides (Tg: 280° C. or higher), polyamide imides (Tg: 280° C.), polyether sulfone (Tg: 223° C.), polyetheretherketone (melting point: 334° C.), polycarbonates (melting point: 220-240° C.), cellulose acetate (melting point: 220° C.), cellulose triacetate (melting point: 300° C.), polysulfone (Tg: 190° C.), polyetherimide (melting point: 216° C.), etc.

(c) Content

The total amount of the additional polyolefin and the heat-resistant resin is preferably 20% or less, for example from about 0 to about 20%, by mass per 100% by mass of the polyolefin solution.

[2] Production Method for Microporous Membrane

The present invention relates to a method for producing the microporous membrane comprising the steps of (1) combining certain specific polyolefins (generally in the form of polyolefin resins) and at least one solvent or diluent to form a polyolefin solution, (2) extruding the polyolefin solution through a die to form an extrudate, (3) cooling the extrudate to form a cooled extrudate, (4) stretching the cooled extrudate at a certain specific temperature to form a stretched sheet, (5) removing the solvent or diluent from the stretched sheet to form a solvent/diluent-removed membrane, (6) stretching the solvent/diluent-removed membrane at a certain specific temperature and to a certain specific magnification to form a stretched membrane, and (7) heat-setting the stretched membrane to form the microporous membrane. A heat-setting treatment step (4i), a heat roll treatment step (4ii), and/or a hot solvent treatment step (4iii) may be conducted between the steps (4) and (5), if desired. A heat-setting treatment step (5i) may be conducted between the steps (5) and (6). A step (5ii) of cross-linking with ionizing radiations following step (5i) prior to step (6), and a hydrophilizing treatment step (7i) and a surface-coating treatment step (7ii) may be conducted after the step (7), if desired.

(1) Preparation of the Polyolefin Solution

The polyolefin resins may be combined with at least one solvent or diluent to prepare a polyolefin solution. Alternatively, the polyolefin resins may be combined, for example, by melt-blending, dry mixing, etc., to make a polyolefin composition, which is then combined with at least one solvent or diluent to prepare a polyolefin solution. The polyolefin solution may contain, if desired, various additives such as antioxidants, fine silicate powder (pore-forming material), etc., in amounts which do not deteriorate the properties of the present invention.

To enable stretching at relatively higher magnifications, the diluent or solvent, e.g. a membrane-forming solvent, is preferably liquid at room temperature. The liquid solvents can be, for example, aliphatic, alicyclic or aromatic hydrocarbons such as nonane, decane, decalin, p-xylene, undecane, dodecane, liquid paraffin, mineral oil distillates having boiling points comparable to those of the above hydrocarbons, and phthalates liquid at room temperature such as dibutyl phthalate, dioctyl phthalate, etc. To most effectively obtain an extrudate having a stable solvent content, it is preferable to use a non-volatile liquid solvent such as liquid paraffin. In an embodiment, one or more solid solvents which are miscible with the polyolefin composition during, for example, melt-blending, but solid at room temperature may be added to the liquid solvent. Such solid solvents are preferably stearyl alcohol, ceryl alcohol, paraffin waxes, etc. In another embodiment, solid solvent can be used without liquid solvent. However, when only the solid solvent is used, uneven stretching, etc., can occur.

The viscosity of the liquid solvent is preferably from about 30 to about 500 cSt, more preferably from about 30 to about 200 cSt, when measured at a temperature of 25° C. When the viscosity at 25° C. is less than 30 cSt, the polyolefin solution may foam, resulting in difficulty in blending. On the other hand, when the viscosity is more than 500 cSt, the removal of the liquid solvent can be difficult.

Though not particularly critical, the uniform melt-blending of the polyolefin solution is preferably conducted in a double-screw extruder to prepare a high concentration polyolefin solution. The diluent or solvent, e.g. a membrane-forming solvent, may be added before starting melt-blending, or supplied to the double-screw extruder in an intermediate portion during blending, though the latter is preferable.

The melt-blending temperature of the polyolefin solution is preferably in a range of the melting point ("Tm") of the polyethylene resin +10° C. to Tm +120° C. The melting point can be measured by differential scanning calorimetry (DSC) according to JIS K7121. In an embodiment, the melt-blending temperature is from about 140 to about 250° C., more preferably from about 170 to about 240° C., particularly where the polyethylene resin has a melting point of about 130 to about 140° C.

To obtain a good hybrid structure, the concentration of the polyolefin composition in the polyolefin solution is preferably from about 25 to about 50% by mass, more preferably from about 25 to about 45% by mass, based on the mass of the polyolefin solution.

The ratio L/D of the screw length L to the screw diameter D in the double-screw extruder is preferably in a range of from about 20 to about 100, more preferably in a range of from about 35 to about 70. When L/D is less than 20, melt-blending can be inefficient. When L/D is more than 100, the residence time of the polyolefin solution in the double-screw extruder can be too long. In this case, the membrane's molecular weight deteriorates as a result of excessive shearing and heating, which is undesirable. The cylinder of the double-screw extruder preferably has an inner diameter of from about 40 to about 100 mm.

In the double-screw extruder, the ratio Q/Ns of the amount Q (kg/h) of the polyolefin solution charged to the number of revolution Ns (rpm) of a screw is preferably from about 0.1 to about 0.55 kg/h/rpm. When Q/Ns is less than 0.1 kg/h/rpm, the polyolefin can be damaged by shearing, resulting in decrease in strength and meltdown temperature. When Q/Ns is more than 0.55 kg/h/rpm, uniform blending cannot be achieved. Q/Ns is more preferably from about 0.2 to about 0.5 kg/h/rpm. The number of revolutions Ns of the screw is preferably 180 rpm or more. Though not particularly critical, the upper limit of the number of revolutions Ns of the screw is preferably about 500 rpm.

(2) Extrusion

The components of the polyolefin solution can be melt-blended in the extruder and extruded from a die. In another embodiment, the components of the polyolefin solution can be extruded and then pelletized. In this embodiment, the pellets can be melt-blended and extruded in a second extrusion to make a gel-like molding or sheet. In either embodiment, the die can be a sheet-forming die having a rectangular orifice, a double-cylindrical, hollow die, an inflation die, etc. Although the die gap is not critical, in the case of a sheet-forming die, the die gap is preferably from about 0.1 to about 5 mm. The extrusion temperature is preferably from about 140 to about 250° C., and the extruding speed is preferably from about 0.2 to about 15 m/minute.

(3) Formation of Cooled Extrudate

The extrudate from the die is cooled to form a cooled extrudate, generally in the form of a high polyolefin content gel-like molding or sheet. Cooling is preferably conducted at least to a gelation temperature at a cooling rate of about 50° C./minute or more. Cooling is preferably conducted to about 25° C. or lower. Such cooling sets the micro-phase of the polyolefin separated by the membrane-forming solvent. Generally, the slower cooling rate provides the gel-like sheet with larger pseudo-cell units, resulting in a coarser higher-order structure. On the other hand, a higher cooling rate results in denser cell units. A cooling rate of less than 50° C./minute can lead to increased crystallinity, making it more difficult to provide the gel-like sheet with suitable stretchability. Usable cooling methods include bringing the extrudate into contact with a cooling medium such as cooling air, cooling water, etc.; bringing the extrudate into contact with cooling rollers; etc.

By high polyolefin content, we mean the cooled extrudate comprises at least about 25%, for example from about 25 to about 50%, polyolefin derived from the resins of the polyolefin composition, based on the mass of the cooled extrudate. We believe that a polyolefin content of less than about 25% of the cooled extrudate makes it more difficult to form a hybrid microporous membrane structure having both small and large pores. A polyolefin content of more than about 50% leads to higher viscosity which makes it more difficult to form the desired hybrid structure. The cooled extrudate preferably has a polyolefin content at least as high as that of the polyolefin solution.

(4) Stretching the Cooled Extrudate

The cooled extrudate, generally in the form of a high polyolefin content gel-like molding or sheet, is then stretched in at least one direction. While not wishing to be bound by any theory or model, it is believed that the gel-like sheet can be uniformly stretched because the sheet contains the membrane-forming solvent. The gel-like sheet is preferably stretched to a predetermined magnification after heating by, for example, a tenter method, a roll method, an inflation method or a combination thereof. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) may be used, though the simultaneous biaxial stretching is preferable. The amount of stretch in either direction need not be the same.

The stretching magnification of this first stretching step can be, for example, 2 fold or more, preferably 3 to 30 fold in the case of monoaxial stretching. In the case of biaxial stretching, the stretching magnification can be, for example, 3 fold or more in any direction, namely 9 fold or more, preferably 16 fold or more, more preferably 25 fold or more, e.g. 49 fold or more, in area magnification. An example for this first stretching step would include stretching from about 9 fold to about 400 fold. A further example would be stretching from about 16 to about 49 fold. Again, the amount of stretch in either direction need not be the same. With the area magnification of 9 fold or more, the pin puncture strength of the microporous membrane is improved. When the area magnification is more than 400 fold, stretching apparatuses, stretching operations, etc., involve large-sized stretching apparatuses, which can be difficult to operate.

In an embodiment, a relatively high stretching temperature is used in this first stretching step, preferably from about the crystal dispersion temperature ("Tcd") of the combined polyethylene content of the cooled extrudate to about Tcd +30° C., e.g. in a range of Tcd of the combined polyethylene content to Tcd +25° C., more specifically in a range of Tcd +10° C. to Tcd +25° C., most specifically in a range of Tcd +15° C. to Tcd +25° C. When the stretching temperature is lower than Tcd, it is believed that the combined polyethylene content is so insufficiently softened that the gel-like sheet is easily broken by stretching, failing to achieve high-magnification stretching.

The crystal dispersion temperature is determined by measuring the temperature characteristics of dynamic viscoelasticity according to ASTM D 4065. Because the combined polyethylene content herein has a crystal dispersion temperature of about 90 to 100° C., the stretching temperature is from about 90 to 125° C.; preferably form about 100 to 125° C., more preferably from 105 to 125° C.

The above stretching causes cleavage between polyolefin, e.g. polyethylene, lamellas, making the polyolefin phases finer and forming large numbers of fibrils. The fibrils form a three-dimensional network structure. The stretching is believed to improve the mechanical strength of the microporous membrane and expands its pores, making the microporous membrane suitable for use as a battery separator.

Depending on the desired properties, stretching may be conducted with a temperature distribution in a thickness direction, to provide the microporous membrane with further improved mechanical strength. The detailed description of this method is given by Japanese Patent 3347854.

(5) Removal of the Solvent or Diluent

For the purpose of removing (washing away, displacing or dissolving) at least a portion of the solvent or diluent, a second solvent, also called a "washing solvent," is used. Because the polyolefin composition phase is phase-separated from a membrane-forming solvent phase, the removal of the solvent or diluent provides a microporous membrane. The removal of the solvent or diluent can be conducted by using one or more suitable washing solvents, i.e., one capable of displacing the liquid solvent from the membrane. Examples of the washing solvents include volatile solvents, e.g., saturated hydrocarbons such as pentane, hexane, heptane, etc., chlorinated hydrocarbons such as methylene chloride, carbon tetrachloride, etc., ethers such as diethyl ether, dioxane, etc., ketones such as methyl ethyl ketone, etc., linear fluorocarbons such as trifluoroethane, $C_6F_{14}$, etc., cyclic hydrofluorocarbons such as $C_5H_3F_7$, etc., hydrofluoroethers such as $C_4F_9OCH_3$, $C_4F_9OC_2H_5$, etc., perfluoroethers such as $C_4F_9OCF_3$, $C_4F_9OC_2F_5$, etc., and mixtures thereof.

The washing of the stretched membrane can be conducted by immersion in the washing solvent and/or showering with the washing solvent. The washing solvent used is preferably from about 300 to about 30,000 parts by mass per 100 parts by mass of the stretched membrane. The washing temperature is usually from about 15 to about 30° C., and if desired, heating may be conducted during washing. The heating temperature during washing is preferably about 80° C. or lower. Washing is preferably conducted until the amount of the remaining liquid solvent becomes less than 1% by mass of the amount of liquid solvent that was present in polyolefin solution prior to extrusion.

The microporous membrane deprived of the diluent or solvent, e.g. a membrane-forming solvent, can be dried by a heat-drying method, a wind-drying (e.g., air drying using moving air) method, etc., to remove remaining volatile components from the membrane, e.g. washing solvent. Any drying method capable of removing a significant amount of the washing solvent can be used. Preferably, substantially all of the washing solvent is removed during drying. The drying temperature is preferably equal to or lower than Tcd, more preferably 5° C. or more lower than Tcd. Drying is conducted until the remaining washing solvent becomes preferably 5% or less by mass, more preferably 3% or less by mass, per 100% by mass (on a dry basis) of the microporous membrane. Insufficient drying undesirably can lead to decrease in the porosity of the microporous membrane by the subsequent heat treatment, resulting in poor permeability.

(6) Stretching the Dried Membrane

The dried membrane is stretched in a second stretching step (re-stretched) at least monoaxially at high magnification. The re-stretching of the membrane can be conducted, for example, while heating, by a tenter method, etc., as in the first stretching step. The re-stretching may be monoaxial or biaxial. In the case of biaxial stretching, any one of simultaneous biaxial stretching or sequential stretching may be used, though the simultaneous biaxial stretching is preferable. Because the re-stretching is usually conducted on the membrane in a long sheet form, which is obtained from the stretched gel-like sheet, the directions of MD and TD (where MD means "machine direction", i.e., the direction of membrane travel during processing, and TD means "transverse direction", i.e., a direction orthogonal to both the MD and the horizontal surface of the membrane) in the re-stretching is usually the same as those in the stretching of the cooled extrudate. In the present invention, however, the re-stretching is actually somewhat greater than that used in the stretching of the cooled extrudate. Stretching magnification in this step is from about 1.1 to about 1.8 fold in at least one direction, for example from about 1.2 to about 1.6 fold. Stretching need not be the same magnification in each direction. If stretching in step (4) of the present method is lower in the range of from about 9 to about 400, then stretching in step (6) of the present method should be higher in the range of from about 1.1 to about 1.8. Likewise, if stretching in step (4) of the present method is higher in the range of from about 9 to about 400, then stretching in step (6) of the present method should be lower in the range of from about 1.1 to about 1.8.

The second stretching or re-stretching is conducted at a second temperature preferably equal to Tm or lower, more preferably in a range of Tcd to Tm. When the second stretching temperature is higher than Tm, it is believed that the melt viscosity is generally too low to conduct good stretching, resulting in low permeability. When the second stretching temperature is lower than Tcd, it is believed that the polyolefin is insufficiently softened so that the membrane might be broken by stretching, i.e., a failure to achieve uniform stretching. In an embodiment, the second stretching temperature is usually from about 90 to about 135° C., preferably from about 95 to about 130° C.

The monoaxial stretching magnification of the membrane in this step, as mentioned above, is preferably from about 1.1 to about 1.8 fold. A magnification of 1.1 to 1.8 fold generally provides the membrane of the present invention with a hybrid structure having a large average pore size. In the case of monoaxial stretching, the magnification can be form 1.1 to 1.8 fold in a longitudinal or transverse direction. In the case of biaxial stretching, the membrane may be stretched at the same or different magnifications in each stretching direction, though preferably the same, as long as the stretching magnifications in both directions are within 1.1 to 1.8 fold.

When the second stretching magnification of the membrane is less than 1.1 fold, it is believed that the hybrid structure is not formed, resulting in poor permeability, electrolytic solution absorption and compression resistance in the membrane. When the second stretching magnification is more than 1.8 fold, the fibrils formed are too fine, and it is believed that the heat shrinkage resistance and the electrolytic solution absorption characteristics of the membrane are reduced. This second stretching magnification is more preferably from 1.2 to 1.6 fold.

The stretching rate is preferably 3%/second or more in a stretching direction. In the case of monoaxial stretching, stretching rate is 3%/second or more in a longitudinal or transverse direction. In the case of biaxial stretching, stretching rate is 3%/second or more in both longitudinal and transverse directions. A stretching rate of less than 3%/second decreases the membrane's permeability, and provides the membrane with large unevenness in properties (particularly, air permeability) in a width direction when stretched in a transverse direction. The stretching rate is preferably 5%/second or more, more preferably 10%/second or more. Though not particularly critical, the upper limit of the stretching rate is preferably 50%/second to prevent rupture of the membrane.

(7) Heat Treatment

The re-stretched membrane is thermally treated (heat-set) to stabilize crystals and make uniform lamellas in the membrane. The heat-setting is preferably conducted by a tenter method or a roll method. The heat-setting temperature is preferably in a range of the second stretching temperature of the membrane ±5° C., more preferably in a range of the second stretching temperature of the membrane ±3° C. It is believed that too low a heat-setting temperature deteriorates the membrane's pin puncture strength, tensile rupture strength, tensile rupture elongation and heat shrinkage resistance, while too high a heat-setting temperature deteriorates membrane permeability.

An annealing treatment can be conducted after the heat-setting step. The annealing is a heat treatment with no load applied to the microporous membrane, and may be conducted by using, e.g., a heating chamber with a belt conveyer or an air-floating-type heating chamber. The annealing may also be conducted continuously after the heat-setting with the tenter slackened. The annealing temperature is preferably Tm or lower, more preferably in a range from about 60° C. to about Tm −5° C. Annealing is believed to provide the microporous membrane with high permeability and strength. Optionally, the membrane is annealed without prior heat-setting. In an embodiment, the heat-setting of step (7) is optional.

(8) Heat-setting Treatment of Stretched Sheet

The stretched sheet between the steps (4) and (5) may be heat-set, provided this heat setting does not deteriorate the properties of the microporous membrane. The heat-setting method may be conducted the same way as described above for step (7).

(9) Heat Roller Treatment

At least one surface of the stretched sheet from step (4) may be brought into contact with one or more heat rollers following any of steps (4) to (7). The roller temperature is preferably in a range of from Tcd +10° C. to Tm. The contact time of the heat roll with the stretched sheet is preferably from about 0.5 second to about 1 minute. The heat roll may have a flat or rough surface. The heat roll may have a suction functionality to remove the solvent. Though not particularly critical, one example of a roller-heating system may comprise holding heated oil in contact with a roller surface.

(10) Hot Solvent Treatment

The stretched sheet may be contacted with a hot solvent between steps (4) and (5). A hot solvent treatment turns fibrils formed by stretching to a leaf vein form with relatively thick fiber trunks, providing the microporous membrane with large pore size and suitable strength and permeability. The term "leaf vein form" means that the fibrils have thick fiber trunks, and thin fibers extending in a complicated network structure from the trunks. The details of the hot solvent treatment method are described in WO 2000/20493.

(11) Heat-setting of Membrane Containing Washing Solvent

The microporous membrane containing a washing solvent between the steps (5) and (6) may be heat-set to a degree that does not deteriorate the properties of the microporous membrane. The heat-setting method may be the same as described above in step (7).

(12) Cross-linking

The heat-set microporous membrane may be cross-linked by ionizing radiation rays such as α-rays, β-rays, γ-rays, electron beams, etc. In the case of irradiating electron beams, the amount of electron beams is preferably from about 0.1 to about 100 Mrad, and the accelerating voltage is preferably form about 100 to about 300 kV. The cross-linking treatment elevates the meltdown temperature of the microporous membrane.

(13) Hydrophilizing Treatment

The heat-set microporous membrane may be subjected to a hydrophilizing treatment (a treatment that makes the membrane more hydrophilic). The hydrophilizing treatment may be a monomer-grafting treatment, a surfactant treatment, a corona-discharging treatment, etc. The monomer-grafting treatment is preferably conducted after the cross-linking treatment.

In the case of surfactant treatment hydrophilizing the heat-set microporous membrane, any of nonionic surfactants, cationic surfactants, anionic surfactants and amphoteric surfactants may be used, and the nonionic surfactants are preferred. The microporous membrane can be dipped in a solution of the surfactant in water or a lower alcohol such as methanol, ethanol, isopropyl alcohol, etc., or coated with the solution by a doctor blade method.

(14) Surface-coating Treatment

While not required, the heat-set microporous membrane resulting from step (7) can be coated with porous polypropylene, porous fluororesins such as polyvinylidene fluoride and polytetrafluoroethylene, porous polyimides, porous polyphenylene sulfide, etc., to improve meltdown properties when the membrane is used as a battery separator. The polypropylene used for the coating preferably has Mw of form about 5,000 to about 500,000, and a solubility of about 0.5 grams or more in 100 grams of toluene at 25° C. Such polypropylene more preferably has a racemic diade fraction of from about 0.12 to about 0.88, the racemic diade being a structural unit in which two adjacent monomer units are mirror-image isomers to each other. The surface-coating layer may be applied, for instance, by applying a solution of the above coating resin in a good solvent to the microporous membrane, removing part of the solvent to increase a resin concentration, thereby forming a structure in which a resin phase and a solvent phase are separated, and removing the remainder of the solvent. Examples of good solvents for this purpose include aromatic compounds, such as toluene or xylene.

[3] Structure, Properties, and Composition of Microporous Membrane (1) Structure The microporous membrane of this invention has a hybrid structure derived from the polyethylene resins, in which its pore size distribution curve obtained by mercury intrusion porosimetry has at least two peaks (main peak and at least one sub-peak). As used herein, the term "pore size" is analogous to the pore diameter in the case where the pores are approximately spherical. The main peak and sub-peak respectively correspond to the dense domains and coarse domains of the polyethylene phase. When the percentage of the first polyethylene in the membrane, which may have a weight average molecular weight of from about $2.5 \times 10^5$ to about $5 \times 10^5$, for example from about $2.5 \times 10^5$ to about $4 \times 10^5$, and a molecular weight distribution of from about 5 to about 100, for example of from about 7 to about 50, is more than 99% by mass based on the total mass of polyolefin in the membrane; or the percentage of polypropylene in the membrane, which may have a weight average molecular weight of from about $3 \times 10^5$ to about $1.5 \times 10^6$, for example from about $6 \times 10^5$ to about $1.5 \times 10^6$, and a molecular weight distribution of from about 1 to about 100, for example of from about 1.1 to about 50, is more than 25% by mass based on the total mass of polyolefin in the membrane; or the percentage of the second polyethylene in the membrane, which may have a weight average molecular weight of from about $5 \times 10^5$ to about $1 \times 10^6$, for example from about $5 \times 10^5$ to about $8 \times 10^5$, is more than 5%, the desired hybrid structure is more difficult to form, resulting in poor electrolytic solution absorption characteristics.

In a preferred embodiment of the microporous polyolefin membrane, the main peak is in a pore size range of 0.01 to 0.08 μm, and at least one sub-peak is in a pore size ranging from more than 0.08 μm to 1.5 μm. In other words, at least one sub-peak has a pore size of greater than 0.08 μm to 1.5 μm or less. More preferably, the main peak is a first peak in a pore size range of about 0.04 to 0.07 μm, and the sub-peaks comprise a second peak in a pore size range of about 0.1 to 0.11 μm, a third peak at a pore size of about 0.7 μm, and a fourth peak in a pore size range of about 1 to 1.1 μm. However, the sub-peaks need not have the third and fourth peaks. For example, the pore size distribution curve may have first to fourth peaks at about 0.06 μm, about 0.1 μm, about 0.7 μm, and about 1.1 μm, respectively.

The pore volume ratio of the dense domains to the coarse domains of the microporous polyolefin membrane of the present invention is determined by standard methods using mercury intrusion porosimetry, etc. Using mercury intrusion porosimetry, hatched area $S_1$ on the smaller diameter side and a vertical line $L_1$ passing the first peak corresponds to the pore volume of the dense domains, and a hatched area $S_2$ on the larger diameter side and a vertical line $L_2$ passing the second peak corresponds to the pore volume of the coarse domains. The pore volume ratio $S_1/S_2$ of the dense domains to the coarse domains is preferably from about 0.5 to about 49, more preferably from about 0.6 to about 10, most preferably from 0.7 to 2. When distinct peaks are not observed in the raw porosimetry data, the approximate positions can be obtained using, e.g., conventional peak deconvolution analysis. For example, the first derivative of the curve representing the number of pores on the y-axis and the pore size on the x-axis can be used to more clearly identify a change in slope (e.g., an inflection) on the curve. When mercury porosimetry is used, it is conventional to measure pore diameter, pore volume, and specific surface area. The measurements can be used to determine a differential pore volume expressed as $$\frac{dVp}{d\text{Log}R}$$

where Vp is the pore volume, and R is the pore radius. The differential pore volume when plotted on the y axis with pore diameter on the x axis is conventionally referred to as the "pore size distribution." In the case of the hybrid structure, at least about 20%, or at least about 25%, or at least about 30%, or at least about 40%, or at least about 50%, or at least about 60% of the differential pore volume is associated with pores that are about 100 nanometers in size (diameter) or larger. In other words, for the curve of $$\frac{dVp}{d\text{Log}R}$$

vs. pore diameter, the fraction of the area under the curve from a pore diameter of about 100 nanometers to about 1,000 nanometers is at least about 20%, or at least about 25%, or at least about 30%, or at least about 40%, or at least about 50%, or at least about 60% of the total area under that curve for pore diameters of from about 10 nanometers to about 1,000 nanometers. In an embodiment, the area under the curve for pore diameters of from about 100 nanometers to about 1,000 nanometers is in the range of about 20% to about 70%, or about 25% to about 60%, or about 30% to about 50% of the total area under the curve for pore diameters of from about 10 nanometers to about 1,000 nanometers.

Though not critical, dense domains and coarse domains are irregularly entangled to form a hybrid structure in any cross sections of the microporous polyolefin membrane viewed in longitudinal and transverse directions. The hybrid structure can be observed by a transmission electron microscope (TEM), etc.

Because the microporous membrane of the present invention has relatively large internal space and openings due to coarse domains, it has suitable permeability and electrolytic solution absorption, with little air permeability variation when compressed. This microporous membrane also has relatively small internal space and openings which influence safety properties of the membrane when used as a battery separator, such as shutdown temperature and shutdown speed. Accordingly, lithium ion batteries such as lithium ion secondary batteries comprising separators formed by such microporous membrane have suitable productivity and cyclability while retaining their high safety performance.

The mercury intrusion porosimetry method used to determine the microporous membrane structure involves use of a Pore Sizer 9320 (Micromeritex Company, Ltd.), a pressure range of from 3.6 kPa to 207 MPa, a cell volume of 15 cm$^3$, a contact angle of mercury of 141.3 and a surface tension of mercury of 484 dynes/cm. The parameters obtained by this included pore volume, surface area ratio, peak top of pore size, average pore size and porosity. References teaching this method include Raymond P. Mayer and Robert A. Stowe, J. Phys. Chem. 70, 12 (1966); L. C. Drake, Ind. Eng. Chem., 41, 780 (1949); H. L. Ritter and L. C. Drake, Ind. Eng. Chem. Anal., 17, 782 (1945) and E. W. Washburn, Proc. Nat. Acad. Sci., 7, 115 (1921).

(2) Properties

In preferred embodiments, the microporous membrane of the present invention has at least one of the following properties.

(a) Air Permeability of Form about 20 to about 400 seconds/100 cm$^3$ (Converted to the Value at 20 μm Thickness)

When the membrane's air permeability measured according to JIS P8117 is from 20 to 400 seconds/100 cm$^3$, batteries with separators formed by the microporous membrane have suitably large capacity and good cyclability. When the air permeability is less than 20 seconds/100 cm$^3$, shutdown does not sufficiently occur because pores are so large that they cannot fully close when the temperatures inside the batteries are elevated at 140° C. or more. Air permeability $P_1$ measured on a microporous membrane having a thickness $T_1$ according to JIS P8117 is converted to air permeability $P_2$ at a thickness of 20 μm by the equation of $P_2=(P_1\times20)/T_1$.

(b) Porosity of from About 25 to About 80%

When the porosity is less than 25%, the microporous membrane is not believed to have good air permeability. When the porosity exceeds 80%, battery separators formed by the microporous membrane are believed to have insufficient strength, which can result in the short-circuiting of battery's electrodes.

(c) Pin Puncture Strength of 2,000 mN or More (Converted to the Value at 20 μm Thickness)

The membrane's pin puncture strength (converted to the value at membrane thickness of 20 μm) is represented by the maximum load measured when the microporous membrane is pricked with a needle of 1 mm in diameter with a spherical end surface (radius R of curvature: 0.5 mm) at a speed of 2 mm/second. When the pin puncture strength is less than 2,000 mN/20 μm, short-circuiting might occur in batteries with separators formed by the microporous membrane. The pin puncture strength is preferably 3,000 mN/20 μm or more, or 4,500 mN/20 μm or more, for example, 5,000 mN/20 μm or more.

(d) Tensile Strength of 49,000 kPa or More

A tensile strength of 49,000 kPa or more in both longitudinal and transverse directions (measured according to ASTM D-882), is characteristic of suitable durable microporous membranes, particularly when used as battery separators. The tensile rupture strength is preferably about 80,000 kPa or more, for example about 100,000 kPa or more.

(e) Tensile Elongation of 100% or More

A tensile elongation of 100% or more in both longitudinal and transverse directions (measured according to ASTM D-882), is characteristic of suitably durable microporous membranes, particularly when used as battery separators.

(f) Heat Shrinkage Ratio of 12% or Less

When the heat shrinkage ratio after being exposed to 105° C. for 8 hours exceeds 12% in both longitudinal and transverse directions, heat generated in batteries with the microporous membrane separators can cause the shrinkage of the separators, making it more likely that short-circuiting occurs on the edges of the separators. Preferably, the heat shrinkage ratio is 3.2% or less.

(g) Thickness Variation Ratio of 20% or Less After Heat Compression

The thickness variation ratio after heat compression at 90° C. under pressure of 2.2 MPa for 5 minutes is generally 20% or less per 100% of the thickness before compression. Batteries comprising microporous membrane separators with a thickness variation ratio of 20% or less have suitably large capacity and good cyclability.

(h) Air Permeability After Heat Compression of 700 sec/100 cm$^3$ or Less

The microporous polyolefin membrane when heat-compressed under the above conditions generally has air permeability (Gurley value) of 700 sec/100 cm$^3$ or less. Batteries using such membranes have suitably large capacity and cyclability. The air permeability is preferably 650 sec/100 cm$^3$ or less, for example, 500 sec/100 cm$^3$ or less.

(i) Surface Roughness of $3 \times 10^2$ nm or More

The surface roughness of the membrane measured by an atomic force microscope (AFM) in a dynamic force mode is generally $3 \times 10^2$ nm or more (measured as the maximum height difference). The membrane's surface roughness is preferably $3.5 \times 10^2$ nm or more.

(3) Microporous Membrane Composition
(1) Polyolefin

An embodiment of the microporous membrane of the present invention comprises (a) from about 74 to about 99% of a first polyethylene having a weight average molecular weight of from about $2.5 \times 10^5$ to about $5 \times 10^5$, for example from about $2.5 \times 10^5$ to about $4 \times 10^5$, and a molecular weight distribution of from about 5 to about 100, for example from about 7 to about 50, (b) from about 1 to about 5% of a second polyethylene having a weight average molecular weight of from about $5 \times 10^5$ to about $1 \times 10^6$, for example from about $5 \times 10^5$ to about $8 \times 10^5$, and a molecular weight distribution of from about 5 to about 100, for example from about 5 to about 50, and (c) optionally from about 0 to about 25% of a polypropylene having a weight average molecular weight of from about $3 \times 10^5$ to about $1.5 \times 10^6$, for example from about $6 \times 10^5$ to about $1.5 \times 10^6$, and a molecular weight distribution of from about 1 to about 100, for example from about 1.1 to about 50, and a heat of fusion of 80 J/g or higher, for example from 80 to about 200 J/g, percentages based on the mass of the membrane.

(a) Polyethylene
(i) Composition

The first polyethylene, for example a high density polyethylene, in the membrane has a weight average molecular weight of from about $2.5 \times 10^5$ to about $5 \times 10^5$ and a molecular weight distribution of from about 5 to about 100. A non-limiting example of the first polyethylene of the membrane is one that has a weight average molecular weight of from about $2.5 \times 10^5$ to about $4 \times 10^5$ and a molecular weight distribution of form about 7 to about 50. The first polyethylene of the membrane can be an ethylene homopolymer, or an ethylene/α-olefin copolymer, such as, for example, one containing a small amount, e.g. about 5 mole %, of a third α-olefin. The third α-olefin, which is not ethylene, is preferably propylene, butene-1, pentene-1, hexene-1, 4-methylpentene-1, octene-1, vinyl acetate, methyl methacrylate, or styrene or combinations thereof.

The second polyethylene, for example an ultra-high molecular weight polyethylene, in the membrane has a weight average molecular weight of from about $5 \times 10^5$ to about $1 \times 10^6$ and a molecular weight distribution of from about 5 to about 100. A non-limiting example of the second polyethylene of the membrane is one that has a weight average molecular weight of from about $5 \times 10^5$ to about $8 \times 10^5$ and a molecular weight distribution of form about 5 to about 50. The second polyethylene of the membrane can be an ethylene homopolymer, or an ethylene/α-olefin copolymer, such as, for example, one containing a small amount, e.g. about 5 mole %, of a third α-olefin. The third α-olefin, which is not ethylene, is preferably propylene, butene-1, pentene-1, hexene-1, 4-methylpentene-1, octene-1, vinyl acetate, methyl methacrylate, or styrene or combinations thereof.

(ii) Molecular Weight Distribution Mw/Mn of the Polyethylene in the Microporous Membrane Though not critical, the Mw/Mn of the polyethylene in the membrane is preferably from about 5 to about 100, for example from about 7 to about 50. When the Mw/Mn is less than 5, the percentage of a higher molecular weight component is too high to conduct melt extrusion easily. On the other hand, when the Mw/Mn is more than 100, the percentage of a lower molecular weight component is too high, resulting in decrease in the strength of the resulting microporous membrane. It is noted that some degradation of Mw from that of the starting resins may occur during manufacturing of the membrane by the present method, for example the Mw of the first polyethylene in the membrane product may be lower than that of the first polyethylene resin in the polyolefin composition portion of the polyolefin solution of method step (1).

(b) Polypropylene

The optional polypropylene in the membrane has a weight average molecular weight of from about $3 \times 10^5$ to about $1.5 \times 10^6$, for example from about $6 \times 10^5$ to about $1.5 \times 10^6$, a heat of fusion of 80 J/g or higher, for non-limiting example from about 80 to about 200 J/g, and a molecular weight distribution of from about 1 to about 100, for example from about 1.1 to about 50, and can be a propylene homopolymer or a copolymer of propylene and another, i.e. a fourth, olefin, though the homopolymer is preferable. The copolymer may be a random or block copolymer. The fourth olefin, which is an olefin other than propylene, includes α-olefins such as ethylene, butene-1, pentene-1, hexene-1, 4-methylpentene-1, octene-1, vinyl acetate, methyl methacrylate, styrene, etc., and diolefins such as butadiene, 1,5-hexadiene, 1,7-octadiene, 1,9-decadiene, etc. The percentage of the fourth olefin in the propylene copolymer is preferably in a range not deteriorating the properties of the microporous polyolefin membrane such as heat resistance, compression resistance, heat shrinkage resistance, etc., and is preferably less than about 10 mole %, e.g. from about 0 to less than about 10 mole %. Again, it is noted that some degradation of Mw from that of the starting resins may occur during manufacturing of the membrane by the present method, for example the Mw of the polypropylene in the membrane product may be lower than that of the polypropylene resin in the polyolefin composition portion of the polyolefin solution of method step (1).

The heat of fusion is determined by differential scanning calorimetry (DSC). The DSC is conducted using a TA Instrument MDSC 2920 or Q1000 Tzero-DSC and data analyzed using standard analysis software. Typically, 3 to 10 mg of polymer is encapsulated in an aluminum pan and loaded into the instrument at room temperature. The sample is cooled to either −130° C. or −70° C. and heated to 210° C. at a heating rate of 10° C./minute to evaluate the glass transition and melting behavior for the sample. The sample is held at 210° C. for 5 minutes to destroy its thermal history. Crystallization behavior is evaluated by cooling the sample from the melt to sub-ambient temperature at a cooling rate of 10° C./minute. The sample is held at the low temperature for 10 minutes to fully equilibrate in the solid state and achieve a steady state. Second heating data is measured by heating this melt crystallized sample at 10° C./minute. Second heating data thus provides phase behavior for samples crystallized under controlled thermal history conditions. The endothermic melting transition (first and second melt) and exothermic crystallization transition are analyzed for onset of transition and peak temperature. The area under the curve is used to determine the heat of fusion ($\Delta H_f$).

The amount of optional polypropylene in the membrane is 25% or less by mass based on the total mass of polyolefin in the membrane. When the percentage of polypropylene in the membrane is more than 25% by mass, the resultant microporous membrane has lower strength. The percentage of polypropylene is preferably 20% or less by mass, more preferably 15% or less by mass.

(2) Other Components

In addition to the above components, the membrane can contain an additional polyolefin and/or heat-resistant polymer having melting points or glass transition temperatures (Tg) of about 170° C. or higher.

(a) Additional Polyolefin

The additional polyolefin can be one or more of (a) polybutene-1, polypentene-1, poly-4-methylpentene-1, polyhexene-1, polyoctene-1, polyvinyl acetate, polymethyl methacrylate, polystyrene and an ethylene/α-olefin copolymer, each of which may have an Mw of from $1\times10^4$ to $4\times10^6$, and (b) a polyethylene wax having an Mw of form $1\times10^3$ to $1\times10^4$. Polybutene-1, polypentene-1, poly-4-methylpentene-1, polyhexene-1, polyoctene-1, polyvinyl acetate, polymethyl methacrylate and polystyrene are not restricted to homopolymers, but may be copolymers containing other α-olefins.

(b) Heat-resistant Polymer

The heat-resistant polymers are preferably (i) amorphous polymers having melting points of about 170° C. or higher, which may be partially crystalline, and/or (ii) amorphous polymers having a Tg of about 170° C. or higher. The melting point and Tg are determined by differential scanning calorimetry (DSC) according to JIS K7121. Examples of the heat-resistant polymers include polyesters such as polybutylene terephthalate (melting point: about 160 to 230° C.), polyethylene terephthalate (melting point: about 250 to 270° C.), etc., fluororesins, polyamides (melting point: 215 to 265° C.), polyarylene sulfide, polyimides (Tg: 280° C. or higher), polyamide imides (Tg: 280° C.), polyether sulfone (Tg: 223° C.), polyetheretherketone (melting point: 334° C.), polycarbonates (melting point: 220 to 240° C.), cellulose acetate (melting point: 220° C.), cellulose triacetate (melting point: 300° C.), polysulfone (Tg: 190° C.), polyetherimide (melting point: 216° C.), etc.

(c) Content

The total amount of the additional polyolefin and the heat-resistant polymer in the membrane is preferably 20% or less by mass per 100% by mass of the membrane.

[4] Battery Separator

In an embodiment, the battery separator formed from any of the above microporous polyolefin membranes of the present invention has a thickness of form about 3 to about 200 μm, or from about 5 to about 50 μm, or from about 7 to about 35 μm, though the most suitable thickness is properly selected depending on the type of battery to be manufactured.

[5] Battery

Though not particularly critical, the microporous polyolefin membranes of the present invention may be used as separators for primary and secondary batteries, particularly such as lithium ion secondary batteries, lithium-polymer secondary batteries, nickel-hydrogen secondary batteries, nickel-cadmium secondary batteries, nickel-zinc secondary batteries, silver-zinc secondary batteries, particularly for lithium ion secondary batteries.

The lithium ion secondary battery comprises a cathode and an anode laminated via a separator, and the separator contains an electrolyte, usually in the form of an electrolytic solution ("electrolyte"). The electrode structure is not critical. Conventional structures are suitable. The electrode structure may be, for instance, a coin type in which a disc-shaped positive and anodes are opposing, a laminate type in which planar positive and anodes are alternately laminated, a toroidal type in which ribbon-shaped positive and anodes are wound, etc.

The cathode usually comprises a current collector, and a cathodic active material layer capable of absorbing and discharging lithium ions which is formed on the current collector. The cathodic active materials may be inorganic compounds such as transition metal oxides, composite oxides of lithium and transition metals (lithium composite oxides), transition metal sulfides, etc. The transition metals may be V, Mn, Fe, Co, Ni, etc. Preferred examples of the lithium composite oxides are lithium nickelate, lithium cobaltate, lithium manganate, laminar lithium composite oxides based on α-NaFeO$_2$, etc. The anode comprises a current collector, and a negative-electrode active material layer formed on the current collector. The negative-electrode active materials may be carbonaceous materials such as natural graphite, artificial graphite, coke, carbon black, etc.

The electrolytic solution can be a solution obtained by dissolving a lithium salt in an organic solvent. The lithium salt may be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. These lithium salts may be used alone or in combination. The organic solvent may be an organic solvent having a high boiling point and high dielectric constant such as ethylene carbonate, propylene carbonate, ethylmethyl carbonate, γ-butyrolactone, etc.; and/or organic solvents having low boiling points and low viscosity such as tetrahydrofuran, 2-methyltetrahydrofuran, dimethoxyethane, dioxolane, dimethyl carbonate, dimethyl carbonate, etc. These organic solvents may be used alone or in combination. Because the organic solvents having high dielectric constants generally have high viscosity, while those having low viscosity generally have low dielectric constants, their mixtures are preferably used.

When the battery is assembled, the separator is impregnated with the electrolytic solution, so that the separator (microporous polyolefin membrane) is provided with ion permeability. The impregnation treatment is usually conducted by immersing the microporous membrane in the electrolytic solution at room temperature. When a cylindrical battery is assembled, for instance, a cathode sheet, a microporous membrane separator and an anode sheet are laminated in this order, and the resultant laminate is wound to a toroidal-type electrode assembly. The resultant electrode assembly is charged/formed into a battery can and then impregnated with the above electrolytic solution, and the battery lid acting as a cathode terminal provided with a safety valve is caulked to the battery can via a gasket to produce a battery.

The present invention will be explained in more detail referring to Examples below without intention of restricting the scope of the present invention.

EXAMPLE 1

Dry-blended to form a mixture are 100 parts by polyolefin composition mass of (i) 2% of ultra-high molecular weight polyethylene (UHMWPE) resin having a weight-average molecular weight (Mw) of $0.7\times10^6$ and a molecular weight distribution (Mw/Mn) of 8, and (ii) 97.8% of high density polyethylene (HDPE) resin having Mw of $3.0\times10^5$ and Mw/Mn of 8.6, and 0.2 parts by mass of the final polyolefin solution of tetrakis[methylene-3-(3,5-ditertiary-butyl-4-hydroxyphenyl)-propionate]methane as an antioxidant. The polyethylene in the mixture has a melting point of 135° C., and a crystal dispersion temperature of 100° C.

The Mw and Mw/Mn of each UHMWPE and HDPE are measured by a gel permeation chromatography (GPC) method under the following conditions.

Measurement apparatus: GPC-150C available from Waters Corporation,
Column: Shodex UT806M available from Showa Denko K. K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 μl,
Detector: Differential Refractometer available from Waters Corp., and
Calibration curve: Produced from a calibration curve of a single-dispersion, standard polystyrene sample using a predetermined conversion constant.

Forty parts by mass of the resultant mixture, i.e. polyolefin solution, is charged into a strong-blending double-screw extruder having an inner diameter of 58 mm and L/D of 42, and 60 parts by mass of liquid paraffin (50 cst at 40° C.) is supplied to the double-screw extruder via a side feeder. Melt-blending is conducted at 210° C. and 200 rpm to prepare a polyethylene solution. This polyethylene solution is extruded from a T-die mounted to the double-screw extruder. The extrudate is cooled while passing through cooling rolls controlled at 40° C., to form a cooled extrudate, i.e. gel-like sheet.

Using a tenter-stretching machine, the gel-like sheet is simultaneously biaxially stretched at 118.5° C. to 5 fold in both longitudinal and transverse directions. The stretched gel-like sheet is fixed to an aluminum frame of 20 cm×20 cm, immersed in a bath of methylene chloride controlled at 25° C. to remove the liquid paraffin with vibration of 100 rpm for 3 minutes, and dried by an air flow at room temperature. The dried membrane is re-stretched by a batch-stretching machine to a magnification of 1.5 fold in a transverse direction at 129° C. The re-stretched membrane, which remains fixed to the batch-stretching machine, is heat-set at 129° C. for 30 seconds to produce a microporous polyethylene membrane.

EXAMPLE 2

Example 1 is repeated except for the polyolefin composition comprising 3% by mass of UHMWPE resin having a weight average molecular weight of $0.54\times10^6$ and an Mw/Mn of 8, and 97% by mass of the HDPE resin having a weight average molecular weight of $3\times10^5$ and an Mw/Mn of 8.6.

EXAMPLE 3

Example 1 is repeated except for the polyolefin composition comprising 90% by mass of the HDPE resin having a weight average molecular weight of $3\times10^5$ and an Mw/Mn of 8.6, and 8% by mass of a PP resin having a weight average molecular weight of $6.6\times10^5$ and a $\Delta H_f$ of 83.3 J/g to go along with the UHMWPE, the stretching temperature is 118° C., the re-stretching temperature is 129.5° C., and the heat setting is at 129.5° C.

COMPARATIVE EXAMPLE 1

Example 1 is repeated except for the polyolefin composition comprising 20% by mass of UHMWPE resin having a weight average molecular weight of $2\times10^6$ and an Mw/Mn of 8; and 80% by mass of HDPE resin having a weight average molecular weight of $3.5\times10^5$ and an Mw/Mn of 8.6. Other exceptions from Example 1 for this Comparative Example 1 are that 30 parts by mass of the resultant polyolefin composition and 70 parts by mass of the liquid paraffin (50 cst at 40° C.) is charged into the double-screw extruder, the stretching temperature is 115° C., and the heat setting temperature is 126.8° C.

The properties of the microporous membranes obtained in the Examples and Comparative Example are measured by the following methods. The results are shown in Table 1 in units indicated below.

(1) Average Thickness (μm)

The thickness of each microporous membrane is measured by a contact thickness meter at 5 cm longitudinal intervals over the width of 30 cm, and averaged. The thickness meter used is a Litematic made by Mitsutoyo Corporation.

(2) Air Permeability (sec/100 cm$^3$/20 μm)

Air permeability $P_1$ measured on each microporous membrane having a thickness $T_1$ according to JIS P8117 is converted to air permeability $P_2$ at a thickness of 20 μm by the equation of $P_2=(P_1\times20)/T_1$.

(3) Porosity (%)

Measured by a weight method using the formula: Porosity %=100×(w2−w1)/w2, wherein "w1" is the actual weight of film and "w2" is the assumed weight of 100% polyethylene.

(4) Pin Puncture Strength (mN/20 μm)

The maximum load is measured when each microporous membrane having a thickness of $T_1$ is pricked with a needle of 1 mm in diameter with a spherical end surface (radius R of curvature: 0.5 mm) at a speed of 2 mm/second. The measured maximum load $L_1$ is converted to the maximum load $L_2$ at a thickness of 20 μm by the equation of $L_2=(L_1\times20)/T_1$, and used as pin puncture strength.

(5) Tensile Strength and Tensile Elongation

They are measured on a 10 mm wide rectangular test piece according to ASTM D882.

(6) Heat Shrinkage Ratio (%)

The shrinkage ratios of each microporous membrane in both longitudinal and transverse directions are measured three times when exposed to 105° C. for 8 hours, and averaged to determine the heat shrinkage ratio.

(7) Thickness Variation Ratio After Heat Compression (%)

A microporous membrane sample is situated between a pair of highly flat plates, and heat-compressed by a press machine under a pressure of 2.2 MPa (22 kgf/cm$^2$) at 90° C. for 5 minutes, to determine an average thickness in the same manner as above. A thickness variation ratio is calculated by the formula of (average thickness after compression−average thickness before compression)/(average thickness before compression)×100.

(8) Air Permeability After Heat Compression (sec/100 cm$^3$)

Each microporous membrane having a thickness of $T_1$ is heat-compressed under the above conditions, and measured with respect to air permeability $P_1$ according to JIS P8117. The measured air permeability $P_1$ is converted to air permeability $P_2$ at a thickness of 20 μm by the equation of $P_2=(P_1\times20)/T_1$.

(9) Electrolytic Solution Absorption Speed

Using a dynamic surface tension measuring apparatus (DCAT21 with high-precision electronic balance, available from Eko Instruments Co., ltd.), a microporous membrane sample is immersed in an electrolytic solution (electrolyte: 1 mol/L of LiPF$_6$, solvent: ethylene carbonate/dimethyl carbonate at a volume ratio of 3/7) kept at 18° C., to determine an electrolytic solution absorption speed by the formula of

[weight increment (g) of microporous membrane/weight (g) of microporous membrane before absorption]. The electrolytic solution absorption speed is expressed by a relative value, assuming that the electrolytic solution absorption rate in the microporous membrane of Comparative Example 1 is 1.

(10) Pore Size Distribution

The pore size distribution of the microporous membrane is determined by mercury intrusion porosimetry.

(11) Pore Volume Ratio

Calculated from $S_1/S_2$.

(12) Surface Roughness

The maximum height difference of a surface measured by AFM in a dynamic force mode (DFM) is used as surface roughness.

TABLE 1

|  | Ex. 1 | Ex. 2 | Ex. 3 | Comp. Ex. 1 |
|---|---|---|---|---|
| PROPERTIES |  |  |  |  |
| Thickness | 20.3 | 20.7 | 21 | 20.1 |
| Air Perm. | 186 | 192 | 175 | 425 |
| Porosity | 42.8 | 42.5 | 44 | 38 |
| Punct. Strength | 5097 | 5054 | 4950 | 4900 |
| Tensile Strength | 116528 | 117630 | 113830 | 148960 |
| MD//TD | 165280 | 166660 | 161280 | 124460 |
| Tensile Elongation | 150 | 160 | 175 | 145 |
| MD//TD | 135 | 140 | 140 | 220 |
| Heat Shrinkage | 2.3 | 2.5 | 2.7 | 5 |
| MD//TD | 2.9 | 3 | 3.2 | 4.5 |
| STRUCTURE |  |  |  |  |
| $1^{ST}$ Peak | 0.06 | 0.05 | 0.05 | 0.04 |
| $2^{nd}$ Peak | 0.11 | 0.1 | 0.13 |  |
| $3^{rd}$ Peak | 0.75 | 0.7 |  |  |
| $4^{th}$ Peak | 1 | 1 |  |  |
| Pore Vol. Ratio | 1.2 | 1.3 | 0.7 | 0.73 |
| Surface Roughness ($\times 10^2$ nm) | 6.0 | 5.9 | 6.5 | 2.1 |
| Elec. Soln. Absorp. Speed | 4.2 | 4.2 | 4.6 | 1 |
| Thick. Var. Aft. Heat Comp. | −16 | −15 | −19 | −20 |
| Air Perm. Aft. Heat Comp. | 487 | 485 | 427 | 962 |

It is noted from Table 1 that the microporous membrane of the present invention exhibits a pore size distribution curve obtained by mercury intrusion porosimetry having a first peak at a pore size of from 0.01 to 0.08 μm, and second to fourth peaks at pore sizes of more than 0.08 μm and 1.5 μm or less, and the surface roughness as a maximum height difference was $3\times10^2$ nm or more. The microporous membrane of the present invention has suitable air permeability, pin puncture strength, tensile rupture strength, tensile rupture elongation and heat shrinkage resistance, as well as improved electrolytic solution absorption, with little variation of thickness and air permeability after heat compression. On the other hand, the microporous membrane product of the Comparative Example exhibits relatively lower electrolytic solution absorption, lower compression properties, higher heat shrinkage, and poorer processability.

Battery separators formed by the microporous polyolefin membrane of the present invention provide batteries with suitable safety, heat resistance, storage properties and productivity.

The invention is further illustrated but not limited by the following embodiments:

1. A method for manufacturing a microporous membrane, comprising:
   (1) combining a polyolefin composition and at least one diluent to form a polyolefin solution, the polyolefin composition comprising (a) from about 74 to about 99% of a first polyethylene resin having a weight average molecular weight of from about $2.5\times10^5$ to about $5\times10^5$ and a molecular weight distribution of from about 5 to about 100, (b) from about 1 to about 5% of a second polyethylene resin having a weight average molecular weight of from about $5\times10^5$ to about $1\times10^6$ and a molecular weight distribution of from about 5 to about 100, and (c) from 0 to about 25% of a polypropylene resin having a weight average molecular weight of from about $3\times10^5$ to about $1.5\times10^6$, a molecular weight distribution of from about 1 to about 100, and a heat of fusion of 80 J/g or higher, the percentages being based on the mass of the polyolefin composition,
   (2) extruding the polyolefin solution through a die to form an extrudate,
   (3) cooling the extrudate to form a cooled extrudate,
   (4) stretching the cooled extrudate in at least one direction at a stretching temperature of from about Tcd of the combined polyethylene of the cooled extrudate to about Tcd +30° C. to form a stretched sheet,
   (5) removing at least a portion of the diluent from the stretched sheet to form a membrane,
   (6) stretching the membrane to a magnification of from about 1.1 to about 1.8 fold in at least one direction to form a stretched membrane, and
   (7) heat-setting the stretched membrane to form the microporous membrane.

2. The method of embodiment 1 further comprising a heat-setting treatment step (4i) between steps (4) and (5) wherein the stretched sheet is heat-set at a temperature of the stretching temperature ±5° C., a heat roll treatment step (4ii) following step (4i) and before step (5) wherein the stretched sheet contacts a heated roller at a temperature from the crystal dispersion temperature of the polyolefin composition to the melting point +10° C. of the polyolefin composition, and a hot solvent treatment step (4iii) following step (4ii) and before step (5) wherein the stretched sheet is contacted with a hot solvent.

3. The method of embodiments 1 or 2 further comprising a heat-setting treatment step (5i) conducted between the steps (5) and (6) wherein the membrane is heat-set at a temperature of the stretching temperature ±5° C., and a cross-linking step (5ii) following step (5i) and before step (6) wherein the heat-set membrane is cross-linked by ionizing radiation rays selected from one or more of α-rays, β-rays, γ-rays, and electron beams.

4. The method of any of embodiments 1, 2, or 3 further comprising a hydrophilizing treatment step (7i) following step (7) wherein the heat-set microporous membrane is made more hydrophilic by one or more of a monomer-grafting treatment, a surfactant treatment, and a corona-discharging treatment.

5. The method of any of embodiments 1 through 4 further comprising a surface-coating treatment step (8) following step (7) wherein the heat-set microporous membrane is coated with one or more of a porous polypropylene, a porous fluororesin, a porous polyimide, and a porous polyphenylene sulfide.

6. The method of any of embodiments 1 through 5 wherein the polyolefin composition comprises (a) from about 75 to about 98% of a first polyethylene resin having a weight average molecular weight of from about $2.5\times10^5$ to about $4 \times 10^5$ and a molecular weight distribution of from about 7 to about 50, (b) from about 2 to about 5% of a second polyethylene resin having a weight average molecular weight of from about $5 \times 10^5$ to about $8 \times 10^5$ and a molecular weight distribution of from about 5 to about 50, and (c) from 0 to about 25% of a polypropylene resin having a weight average molecular weight of from about $6 \times 10^5$ to about $1.5 \times 10^6$, a molecular weight distribution of from about 1.1 to about 50, and a heat of fusion of from 80 to about 200 J/g, percentages based on the mass of the polyolefin composition.

7. The method of any of embodiments 1 through 6 wherein the diluent is a membrane-forming solvent which is liquid at room temperature and has a viscosity ranging from 30 to 500 cSt at a temperature of 25° C.

8. The method of any of embodiments 1 through 7 wherein the temperature of step (1) is from the melting point of the polyolefin composition +10° C. to the melting point of the polyolefin composition +120° C.

9. The method of any of embodiments 1 through 8 wherein the concentration of the polyolefin composition in the polyolefin solution is from about 25 to about 50% based on the mass of the polyolefin solution.

10. The method of any of embodiments 1 through 9 wherein the extruding of step (2) is conducted at an extrusion temperature ranging from about 140 to about 250° C., and the cooling of step (3) is conducted at least to the gelation temperature of the extrudate at a cooling rate of 50° C./minute or more.

What is claimed is:

1. A microporous membrane comprising (a) from about 74 to about 99% of a first polyethylene having a weight average molecular weight of from about $2.5 \times 10^5$ to about $5 \times 10^5$ and a molecular weight distribution of from about 5 to about 100, (b) from about 1 to about 5% of a second polyethylene having a weight average molecular weight of from about $5 \times 10^5$ to about $1 \times 10^6$ and a molecular weight distribution of from about 5 to about 100, and (c) from 0 to about 25% of a polypropylene having a weight average molecular weight of from about $3 \times 10^5$ to about $1.5 \times 10^6$, a molecular weight distribution of from about 1 to about 100, and a heat of fusion of 80 J/g or higher, percentages based on the mass of the membrane, wherein the membrane 1) comprises pores characterized by a pore size distribution curve, wherein differential pore volume is plotted on a y axis and pore diameter on an x axis, having at least two peaks, and 2) contains dense domains corresponding to a main peak in a range of 0.01 µm to 0.08 µm in the pore size distribution curve and coarse domains corresponding to at least one sub-peak in a range of more than 0.08 µm and 1.5 µm or less in the pore size distribution curve.

2. The microporous membrane of claim 1, wherein the pore volume ratio of the dense domains to the coarse domains ranges from 0.5 to 49.

3. The microporous membrane of claim 1, wherein the microporous membrane has surface roughness of $3 \times 10^2$ nm or more when measured as a maximum height difference between two points on the membrane.

4. The microporous membrane of claims 1, comprising (a) from about 75 to about 98% of a first polyethylene having a weight average molecular weight of from about $2.5 \times 10^5$ to about $4 \times 10^5$ and a molecular weight distribution of from about 7 to about 50, (b) from about 2 to about 5% of a second polyethylene having a weight average molecular weight of from about $5 \times 10^5$ to about $8 \times 10^5$ and a molecular weight distribution of from about 5 to about 50, and (c) from 0 to about 25% of a polypropylene having a weight average molecular weight of from about $6 \times 10^5$ to about $1.5 \times 10^6$, a molecular weight distribution of from about 1.1 to about 50, and a heat of fusion of from 80 to about 200 J/g, percentages based on the mass of the membrane.

5. The microporous membrane of claim 1, wherein
   (a) the first polyethylene is one or more of ethylene homopolymer or ethylene/α-olefin copolymer having a weight average molecular weight of from about $2.5 \times 10^5$ to about $5 \times 10^5$ and a molecular weight distribution of from about 5 to about 100;
   (b) the second polyethylene is one or more of ethylene homopolymer or ethylene/α-olefin copolymer having a weight average molecular weight of from about $5 \times 10^5$ to about $1 \times 10^6$ and a molecular weight distribution of from about 5 to about 100; and
   (c) the polypropylene is one or more of propylene homopolymer or propylene/α-olefin copolymer having a weight average molecular weight of from about $3 \times 10^4$ to about $1.5 \times 10^6$ and a molecular weight distribution of from about 1 to about 100.

6. The microporous membrane of claim 1, wherein the membrane further comprises a third polymer selected from one or more of polybutene-1, polypentene-1, poly-4-methylpentene-1, polyhexene-1, polyoctene-1, polyvinyl acetate, polymethyl methacrylate, polystyrene, and ethylene/α-olefin copolymer.

7. The microporous membrane of claim 1, having an air permeability measured according to JIS P8117 ranging from about 20 to about 400 seconds/100 cm$^3$, a porosity ranging from about 25 to about 80%, a pin puncture strength of about 2,000 mN or more at a membrane thickness of 20 µm, a tensile strength of about 49,000 kPa or more, a tensile elongation of 100% or more, a heat shrinkage ratio of 12% or less, a thickness variation ratio of 20% or less after heat compression, an air permeability of 700 sec/100 cm$^3$ or less after heat compression, and a surface roughness of $3 \times 10^2$ nm or more.

8. A battery separator comprising a microporous membrane comprising (a) from about 74 to about 99% of a first polyethylene having a weight average molecular weight of from about $2.5 \times 10^5$ to about $5 \times 10^5$ and a molecular weight distribution of from about 5 to about 100, (b) from about 1 to about 5% of a second polyethylene having a weight average molecular weight of from about $5 \times 10^5$ to about $1 \times 10^6$ and a molecular weight distribution of from about 5 to about 100, and (c) from 0 to about 25% of a polypropylene having a weight average molecular weight of from about $3 \times 10^5$ to about $1.5 \times 10^6$, a molecular weight distribution of from about 1 to 100, and a heat of fusion of 80 J/g or higher, percentages based on the mass of the membrane, wherein the membrane 1) comprises pores characterized by a pore size distribution curve, wherein differential pore volume is plotted on a y axis and pore diameter on an x axis, having at least two peaks, and 2) contains dense domains corresponding to a main peak in a range of 0.01 µm to 0.08 µm in the pore size distribution curve and coarse domains corresponding to at least one sub-peak in a range of more than 0.08 µm and 1.5 µm or less in the pore size distribution curve.

9. The battery separator of claim 8, wherein the membrane contains dense domains corresponding to a main peak in a range of 0.01 to 0.08 µm in the pore size distribution curve and coarse domains corresponding to at least one sub-peak in a range of more than 0.08 µm and 1.5 µm or less in the pore size distribution curve.

10. The battery separator of claim 9, wherein the pore volume ratio of the dense domains to the coarse domains ranges from 0.5 to 49.

11. The battery separator of claim 8, wherein the microporous membrane has surface roughness of from about $3 \times 10^2$ nm to about $3 \times 10^3$ nm when measured as a maximum height difference between two points on the surface of the battery separator.

12. The battery separator of claim 8, wherein the membrane comprises (a) from about 75 to about 98% of a first polyethylene having a weight average molecular weight of from about $2.5 \times 10^5$ to about $4 \times 10^5$ and a molecular weight distribution of from about 7 to about 50, (b) from about 2 to about 5% of a second polyethylene having a weight average molecular weight of from about $5 \times 10^5$ to about $8 \times 10^5$ and a molecular weight distribution of from about 5 to about 50, and (c) from 0 to about 25% of a polypropylene having a weight average molecular weight of from about $6 \times 10^5$ to about $1.5 \times 10^6$, a molecular weight distribution of from about 1.1 to about 50, and a heat of fusion of from 80 to about 200 J/g, percentages based on the mass of the membrane.

13. The microporous membrane of claim 1, wherein pore size distribution used to determine the pore size distribution curve is determined by mercury intrusion porosimetry.

14. The battery separator of claim 8, wherein pore size distribution used to determine the pore size distribution curve is determined by mercury intrusion porosimetry.

* * * * *